United States Patent [19]

Walsh

[11] 4,145,808
[45] Mar. 27, 1979

[54] KNIFE FOR STRIPPING TUBING FROM CONDUCTORS ENCLOSED THEREIN

[76] Inventor: James R. Walsh, 758 Malloy Ave., Aston, Delaware County, Pa. 19014

[21] Appl. No.: 853,895

[22] Filed: Nov. 22, 1977

[51] Int. Cl.² ............................................ B21F 13/00
[52] U.S. Cl. ..................................... 30/91.2; 30/90.7; 30/161
[58] Field of Search ....................... 30/91.2, 90.4, 90.6, 30/90.7, 161

[56] References Cited

U.S. PATENT DOCUMENTS

| | | | |
|---|---|---|---|
| 2,817,255 | 12/1957 | Lormeau | 30/91.2 |
| 2,924,879 | 2/1960 | Kraus | 30/151 |
| 3,116,554 | 1/1964 | Davis | 30/90.7 |
| 3,162,945 | 12/1964 | Stabs | 30/90.4 |

FOREIGN PATENT DOCUMENTS 190565  7/1957  Austria ....................................... 30/90.4

Primary Examiner—Al Lawrence Smith
Assistant Examiner—J. T. Zatarga
Attorney, Agent, or Firm—Paul & Paul

[57] ABSTRACT

A utility company lineman's knife is provided for cutting the tubing or sheath of multi-conductor cable. The knife has an elongated slotted handle which receives the cutting blade and in which the blade is pivotal into any one of three locked positions, namely, closed, opened to an intermediate position for circumferential cutting, and fully opened for longitudinal cutting. The locked positions are controlled by a spring-biased J-bolt the short leg of which is adapted to enter into any one of three detent holes in the blade. The tip of the knife is provided with a protective button which functions as a bearing surface against the inner wall of the tubing and allows outward tension to be applied to the knife blade to maintain the cutting edge away from the inner conductors, thereby to protect the interior conductors and insulation against accidental cutting. The handle of the knife is provided with an extension or guide saddle having a curved surface which bears against the cable and coacts with the knife blade and button to maintain outward tension on the knife and button as the knife is rolled about the cable during circumferential cutting.

5 Claims, 6 Drawing Figures

KNIFE FOR STRIPPING TUBING FROM CONDUCTORS ENCLOSED THEREIN

BACKGROUND OF THE INVENTION

In stripping external plastic tubing or other tubular sheath material from preassembled multi-conductor cable to allow the lineman to splice and/or terminate the conductors enclosed therein, one prior art method has been of hack-sawing the tubing. However, this exposes the conductors within the tubing to the risk of being cut unintentionally and has resulted in many conductor failures.

The prior art has also provided various forms of cutting tools for the specific purpose of cutting and stripping metal or other sheathing of electric conductor cables. Such tools are shown in the following prior art U.S. patents: Walker, U.S. Pat. No. 2,348,429; Thompson, U.S. Pat. No. 2,363,758; Jones, U.S. Pat. No. 2,370,733; Vaughan, Jr. U.S. Pat. No. 2,691,822; Kraus, U.S. Pat. No. 2,924,879; Davis U.S. Pat. No. 3,116,554; Stabs, U.S. Pat. No. 3,162,945; Pettit et al, U.S. Pat. No. 3,624,901.

The tool provided by the present invention is generally similar to but is an improvement over the tool shown in the Kraus patent U.S. Pat. No. 2,924,879, as will be described.

SUMMARY OF THE INVENTION

The object of the present invention is to provide a lineman's stripping knife for cutting the sheath or tubing of preassembled multi-conductor cable without injury to the interior conductors.

DETAILED DESCRIPTION OF THE PREFERRED EMBODIMENTS

Figure 1:
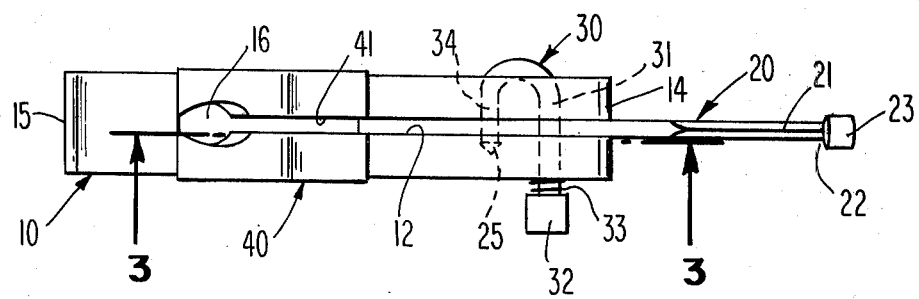
FIG. 1 is a top plan view showing the stripping knife of the present invention with the blade in locked open position.

A lineman's knife, according to the present invention, comprises an elongated handle 10 of wood or hard plastic or other suitable material having a lengthwise extending through slot 12 which extends from one end 14 of the handle toward but terminates short of the other end 15.

A cutting blade 20 of steel or other suitable material is pivotal within slot 12 about the long leg 31 of a locking J-bolt 30. Blade 20 has a curved sharpened cutting edge 21 which terminates in a tip 22 protected by button 23. Button 23 may be of brass or other suitable material. In addition to serving as protection for the tip of the knife, button 23 also serves an important function as a bearing surface, as will be described.

Figure 2:
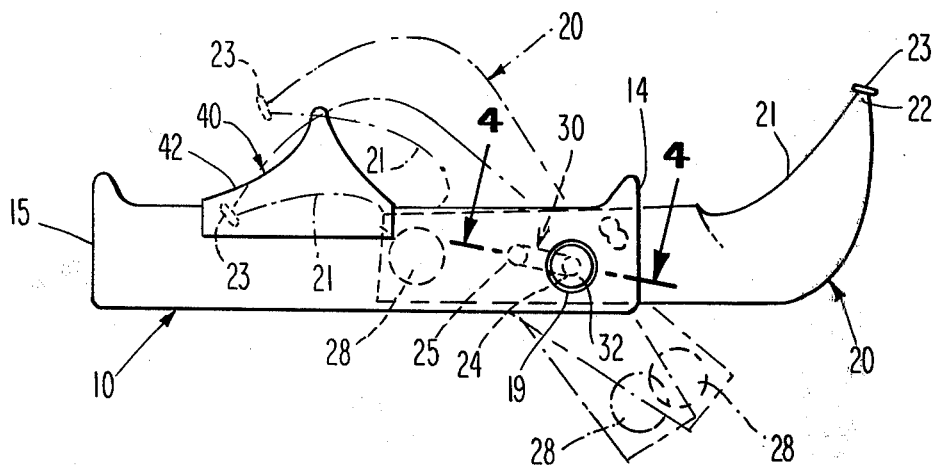
FIG. 2 is a side view of the knife of FIG. 1 showing the blade in solid line in locked open position, and in phantom in locked intermediate and locked closed positions.

Blade 20 is provided with a number of holes, including a center pivot hole 24 for receiving the long leg 31 of the J-bolt 30, three detent or locking holes 25, 26 and 27 for receiving the short leg 34 of the J-bolt, and an enlarged eye 28 at the remote end of the blade from the cutting edge 21 for attaching the knife to the belt hook of the lineman. The eye 28 is hidden within the handle 10 when the blade is in the fully open position, as seen in FIG. 2.

Figures 3, 4:
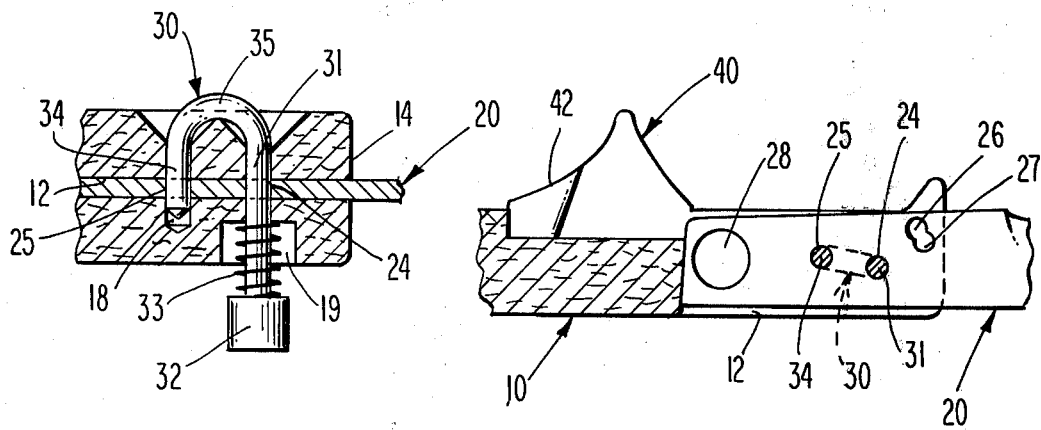
FIG. 3 is a fragmentary side view of the knife blade in locked open position looking along the line 3—3 of FIG. 1.
FIG. 4 is a fragmentary top view, partly in section, of the locking J-bolt as seen looking along the line 4—4 of FIG. 2.

As seen best in FIG. 4, handle 10 is provided with a through hole 17 located near to the end 14 of the handle. Hole 17 is provided with an enlarged diameter 19 at one side of the handle for receiving the enlarged head 32 of the J-bolt 30. Adjacent to hole 17 is a short hole 18 which only extends through the one side of the handle opposite to the enlargement 19 and slightly beyond the center slot 12 as seen in FIG. 4. Both of the holes 17 and 18 are countersunk for accommodating the curved portion 35 of the J-bolt 30.

Inserted in through pivot hole 17 is the long leg 31 of the J-bolt having the enlarged head 32. Bolt 30 is biased outwardly by a spring 33. The short leg 34 of the J-bolt 30 is received in the short hole 18 of the handle 10 and is urged toward the center slot 12 by the action of the spring 33. The short leg 34, being biased inwardly by spring 33, bears against the blade 20. When, during pivotal movement of the blade 20 about the long leg 31 of the J-bolt 30, the short leg 34 comes into registry with one of the three detent or locking holes 25, 26 and 27, the short leg 34 enters the locking hole, as illustrated in FIG. 4. This prevents further pivotal movement of blade 20 about the long leg 31.

In the locked open position illustrated in FIGS. 1–4 and 6, the short leg 34 of the J-bolt is in locking hole 25 of the blade. To close the knife, the lineman depresses the enlarged head 32 of the J-bolt against the action of the spring 33. This removes the short leg 34 of the J-bolt from the locking hole 25 and allows the blade 20 to be pivoted on the long leg 31.

After pivoting the blade 20 in a counterclockwise direction as viewed in FIG. 2 away from the locked open position shown in solid line, if the lineman releases the inward pressure on the head 32 of the spring-biased J-bolt, the short leg 34 will bear against the blade 20 until it comes into registry with the next locking hole 26. The leg 34 will then enter the hole 26 and this will lock the blade 20 in the intermediate position shown in phantom in FIG. 2 and in solid line in FIG. 5.

If, with blade 20 in the locked intermediate position, the lineman depresses the head of the J-bolt and pivots the blade 20 further in the counterclockwise direction, releasing the J-bolt as he does so, the leg 34 will enter the next locking hole 27 when the end of the short leg 34 comes into registry therewith. This will lock the blade 20 in the closed position shown in phantom in FIG. 2.

Figure 5:
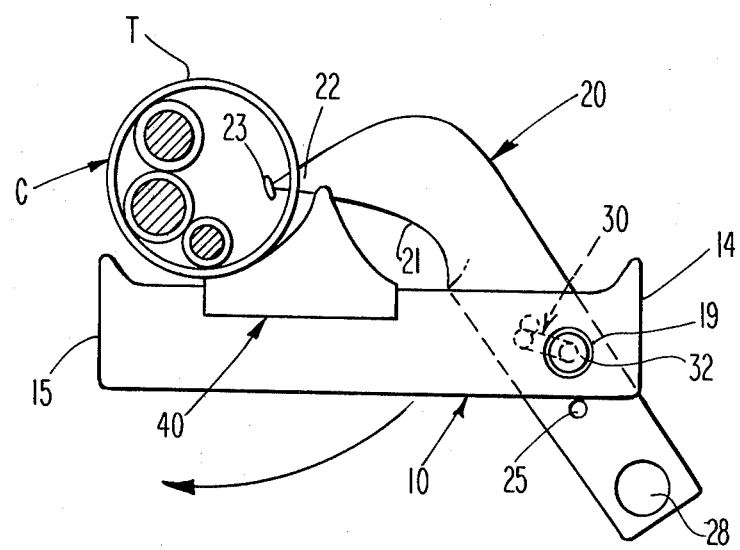
FIG. 5 is a side view showing the knife with the blade in locked intermediate position being used to make a circumferential cut in the cable sheath.
Figure 6:
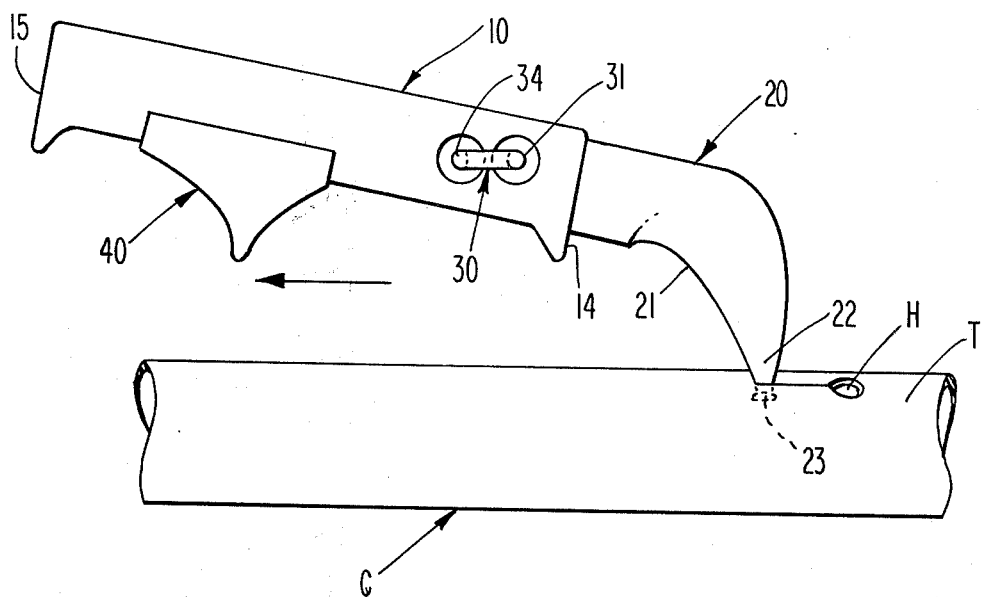
FIG. 6 is a view showing the knife with the blade in locked open position being used to make a lengthwise cut in the cable sheath.

It will be seen then that blade 20 can be locked in any one of the three positions, namely, open, intermediate, or closed. The open position is used for lengthwise cutting, as illustrated in FIG. 6. The intermediate position is used for circumferential cutting, as illustrated in FIG. 5. The closed position is used for carrying the knife with the cutting edge 21 covered by the guard saddle 40 which has a slot 41 therein for receiving the blade 20. Thus, the lineman is protected against cutting himself when the knife is not in use. In the closed position the eye 28 is exposed and may be used for hanging the knife on the lineman's hook.

To assist in making a circumferential cut around the tubing of a multi-conductor cable without cutting and damaging the interior conductors or their insulations, the handle of the knife, according to the present invention, is provided with an extension in the form of a saddle 40 having a curved surface 42 which is adapted to bear against the cable C as the knife is rolled around the cable during circumferential cutting. In this action, the saddle coacts with the locked knife blade 20 and button 23 to keep the button 23 and tip 22 of the knife close to the inner surface to the tubing T thereby to permit cutting of the tubing T without damage to the interior conductors.

To allow the knife to be fully closed, saddle 40 is provided with a center slot 41 aligned with slot 12 of handle 10. Slots 41 and 12 are provided with enlarged openings 46 and 16 for receiving the button 23. When the knife 20 is locked in fully closed position (the lower of the two phantom positions illustrated in FIG. 2) the curved cutting edge 21 of the knife blade 20 is within the slot 41 of the saddle 40, thereby protecting the lineman against accidentally cutting himself as he carries the knife around in the fully closed position.

For longitudinal cuts, a small hole H is carefully opened into tubing T large enough to receive the guard button 23. Hole H is opened at a location intermediate of the area to be stripped. Longitudinal cuts are then made in both directions from the hole H. In making the longitudinal cuts, the lineman maintains outward tension on the knife to maintain the button 23 pressed against the inner surface of the tubing. This is illustrated in FIG. 6.

At the end of a longitudinal cut, where it is desired to make a circumferential cut, the blade tip 22 is turned from the longitudinal to the transverse direction without removing the knife blade 20 from the tubing T. The lineman then changes the blade 20 from the locked open position shown as FIG. 6 to the locked intermediate position illustrated in FIG. 5. The knife is then rolled around the cable in such manner as to maintain the button 23 pressed against the inner surface of the tubing. In this rolling action, the saddle 40 bears against the cable and coacts with the locked blade 20 and with button 23 to cause the button 23 to bear against the inner surface of the tubing. As a result, the tubing T is cut smoothly and easily without permitting the sharp portion 21 of the knife blade to come into contact with and damage the inner conductors or their insulation.

As previously indicated, the lineman's knife of the present invention is generally similar to the knife shown in Kraus U.S. Pat. No. 2,924,879, but there are several important differences. These will now be briefly discussed.

A first difference is that the blade of the Kraus knife locks in only two positions, an open position and a closed position. In contrast Kraus, the knife of the present invention locks at an additional or third position. This is the position used for circumferential cutting. In this position, the blade is locked at a specific intermediate partially-open position at which the blade makes an acute angle with the handle. To lock the blade in this intermediate position, the handle end of the blade is provided with an appropriately located extra detent hole to receive the short leg of the J-bolt.

A second difference between the Kraus knife and the knife of the present invention is that, in the present invention, the tip 22 of the blade 20 is blunted or protected with a special button 23. This button performs an important function. It acts as a bearing surface which bears against the inner surface of the tubing and allows the lineman to apply an outward pull or tension on the knife blade as he makes his longitudinal or circumferential cut. This results in keeping the sharp cutting edge 21 of the blade away from the interior conductors and their insulation.

A third difference between the Kraus knife and the knife of the present invention is that, in accordance with the present invention, the blade side of the handle 10 is provided with a bifurcated guide extension or saddle 40 having a suitably curved surface 42 in the plane of the blade 20 to act as a guide and bearing surface which allows the knife to be rolled around the cable during circumferential cutting of the tubing.

What is claimed is

1. A lineman's knife comprising:
   a. a handle having a longitudinal slot extending through the handle from the upper to the lower surfaces;
   b. a spring-loaded J-bolt having its long leg passing through said handle transverse to said slot;
   c. a knife blade mounted in said handle slot for pivotal movement on the long leg of said J-bolt, said blade having a cutting edge on the upper edge thereof;
   d. a plurality of detent holes in said blade for receiving the short leg of said J-bolt for maintaining said knife blade locked in any one of a plurality of positions one of which is a position such that said cutting edge of said blade is at an acute angle relative to the upper surface of said handle;
   e. an extension on the upper surface of said handle extending into said acute angle, said extension including a curved surface in the plane of said knife blade;
   f. an enlarged bearing surface at the tip of said knife blade, said bearing surface being adapted to be inserted into a hole cut into the sheath of a cable, said curved surface of said handle extension being adapted to bear against the outer surface of said cable as said knife blade in said acute-angle position is drawn about the cable causing the enlarged bearing surface at the tip of said knife blade to bear outwardly against the inner surface of the sheath of said cable.

2. A lineman's knife according to claim 1 wherein said handle extension has a slot in the plane of the knife, said slot having an enlarged opening for receiving the enlarged bearing surface at the tip of the knife blade.

3. A lineman's knife according to claim 2 wherein the knife blade is steel and the bearing surface at the tip of the knife is a brass button.

4. A lineman's knife according to claim 1 wherein there are three detent holes for locking said knife blade in any one of three positions, one of which is a fully opened position, another of which is a fully closed position, and the third of which is an intermediate position in which the cutting edge of the knife blade forms an acute angle with the upper surface of the handle.

5. A lineman's knife according to claim 3 wherein there are three detent holes for locking said knife blade in any one of three positions, one of which is a fully opened position, another of which is a fully closed position, and the third of which is an intermediate position in which the cutting edge of the knife blade forms an acute angle with the upper surface of the handle.

* * * * *